(12) United States Patent
Glenn

(10) Patent No.: US 6,434,518 B1
(45) Date of Patent: Aug. 13, 2002

(54) LANGUAGE TRANSLATOR

(76) Inventor: Charles A. Glenn, 516 Little City Rd., Higganum, CT (US) 06441

( * ) Notice: Subject to any disclaimer, the term of this patent is extended or adjusted under 35 U.S.C. 154(b) by 0 days.

(21) Appl. No.: 09/404,099

(22) Filed: Sep. 23, 1999

(51) Int. Cl.[7] .............................................. G06F 17/28
(52) U.S. Cl. ........................................ 704/3; 434/156
(58) Field of Search ............................ 704/2, 3, 4, 5–7, 704/277, 258; 434/156, 157

(56) References Cited

U.S. PATENT DOCUMENTS

| | | | | |
|---|---|---|---|---|
| 4,733,368 A | * | 3/1988 | Morimoto | 704/2 |
| 4,758,977 A | * | 7/1988 | Morimoto et al. | 704/3 |
| 5,063,508 A | * | 11/1991 | Yamada et al. | 704/3 |
| 5,091,950 A | * | 2/1992 | Ahmed | 704/3 |
| 5,191,617 A | * | 3/1993 | Bolin et al. | 704/270 |
| 5,275,569 A | * | 1/1994 | Watkins | 434/157 |
| 5,480,306 A | * | 1/1996 | Liu | 434/156 |
| 5,487,671 A | * | 1/1996 | Shpiro et al. | 434/187 |
| 5,523,943 A | * | 6/1996 | Maruta et al. | 704/3 |
| 5,765,131 A | * | 6/1998 | Stentiford et al. | 704/277 |
| 5,810,599 A | * | 9/1998 | Bishop | 434/147 |
| 5,854,997 A | * | 12/1998 | Sukeda et al. | 704/3 |
| 5,865,625 A | * | 2/1999 | Baskerville | 434/157 |
| 5,991,771 A | * | 11/1999 | Seno et al. | 704/3 |
| D425,518 S | * | 5/2000 | Simms | D14/100 |

* cited by examiner

Primary Examiner—Patrick N. Edouard
(74) Attorney, Agent, or Firm—Alix, Yale & Ristas, LLP

(57) ABSTRACT

An electronic translator has the form of a compact battery-powered case which includes a memory of electronically recorded translations of a given base and language. A booklet or visual display is mounted to one panel of the case. A selection input allows a given word or phrase to be selected, and the selected phrase is electronically transmitted through a speaker or other audio device in grammatically correct and fluently spoken audio form. A recorder is also provided for recording a trial facsimile of the transmitted translation.

13 Claims, 5 Drawing Sheets

LANGUAGE TRANSLATOR

BACKGROUND OF THE INVENTION

This invention relates generally to devices which are employed to facilitate learning and communication in foreign languages. More particularly, the present invention relates to electronic devices wherein the user interacts with the device to provide a responsive audio output.

There has recently been a proliferation of devices which employ speech and/or sound inputs and/or outputs to communicate useful information of various forms. A number of devices, for example, may provide various types of input techniques and employ electronic speech synthesizers which communicate with the user by means of synthesized speech. The communication by synthesized speech enhances learning effectiveness but cannot convey other attributes of language, emphasis and inflection, for example, without requiring additional electronic memory and circuit complexity.

A number of devices have been adapted in part to function in connection with learning and/or communicating in foreign language applications. One device is disclosed in Liu U.S. Pat. No. 5,480,306 wherein a language learning apparatus employs an optical code as the input medium. An optical code/bar code is associated with each of a number of word sentences, etc. Digitized pronunciations of the words and sentences are stored in electronic memory. Each word sentence entry is assigned a distinct optical code/bar code correlated accurately with the printed material as well as with a memory address. An optical code reader and a signal decoder circuit convert the optical code of the selected word sentence into an associated electrical signal which, in turn, is converted into a memory address pointing to the associated digitized sound that is stored in the electronic memory. The digitized sound data at the memory address is copied and converted to analog for broadcasting by a loudspeaker system. The digital sound data may comprise pronunciations in more than one language.

SUMMARY OF THE INVENTION

Briefly stated, the invention in a preferred form is a compact, hand-held electronic translator which functions to provide users with actual voice translations of selected word sentences. The translator comprises a compact case. Memory modules mountable to the top of the case and electrically connected thereto house electronic memory devices able to receive and store audio material and to make it available for retrieval and broadcasting as desired, without digital compression or conversion or voice synthesis techniques. Translations in male or female voices are stored in the modules as random access, read only memory, each in analog form with all the emphasis, inflection, nuances, etc. important to the learning of a foreign language. A booklet forms part of each memory module. The booklet contains base language word sentences and their stored translations. Modules can be removed and replaced by others offering different language pairs, subject matter or levels of difficulty.

In use, a memory module is mounted to the case and thereby connected electrically to the case, and its booklet opened to the page presenting the desired translation. Input devices mounted to the case facilitate translation selection. A module is positioned to form the module/case electrical connection so that each booklet base language/translation line is aligned with an input device. There are eight such sequentially numbered input devices, the actuation of any one inputting one byte of digital information. The number of the page presenting the desired translation is selected by first actuating an input device designated page select which sets internal circuitry to interpret the next numbered input device actuation as a page number selection. Such actuation latches the selection as a page byte of memory address, latches a numeric LED to display the selection and resets the internal circuitry to again interpret numbered input device actuations as translation line number selections. The desired translation is selected by actuating its associated input device, the actuation being interpreted by the internal circuitry as a line byte of memory address to be combined with the page byte for retrieval of the desired translation. The selected translation is copied from the electronic memory and transmitted to the speaker for broadcasting. Translations can be selected in any order. A translation on the same selected page may be broadcast by simply actuating its associated numbered input device, its page byte of memory address having been latched and available for use. Desired translations on other pages are first identified by page number by use of the page select input device and the appropriate numbered input device.

Base language/translation entries in module booklets are presented in a co-linear arrangement, the base language above in light face type and the second language translations below in more outstanding style type. Each line pair is segmented along its length such that meaningful parts of the base language are grouped with corresponding parts of the translation and spaced apart from adjacent groups to form a language dictionary in which a base language word or expression has its translation presented directly below and a translation has its base language meaning presented directly above. On each page, adjacent to the language lines, are notes on spelling, grammar, usage, etc. pertaining specifically to the translations on the page, providing a user with timely, important information.

The device contains a voice recorder with which the user can try to emulate retrieved translations for comparison or as evidence of language proficiency. The recorder utilizes separate, dedicated electronic memory similar to that used in memory modules, in that recordings are stored in analog form suitable for direct broadcasting by a loudspeaker, the user thereby being able to practice emphasis, inflection and other attributes of language. The recorder can be used as an ordinary message recorder completely independent of the language translation function of the device. The recorder can be used cooperatively with the translation retrieval function of the device, in that the user can listen to a translation, attempt emulation using the recorder, replay each in turn to compare, listening, recording, comparing as much as desired. The recorder can be configured to operate in a sentence construction mode, in which separate recordings of words, phrases or sentences can be edited and added to, yet played as a continuous recording, enabling the user to attempt actual discourse in the foreign language.

By grounding a designated module electrical connection, module memory is configured to accept audio material and store it at specified memory addresses. Restoring voltage to the designated connection reconfigures the module to its read only state. Such an option offers the possibility of "re-languaging" modules at foreign travel facilities.

An object of the invention is to provide a language translator which may be employed by travelers in language learning applications to communicate in a foreign language in an efficient manner.

Another object of the invention is to provide a new and improved language translator which is compact and is relatively easy to use.

A further object of the invention is to provide a new and improved language translator which is capable of application in connection with numerous languages.

A further object of the invention is to provide a new and improved language translator which facilitates the communication in a foreign language and aids the user to speak proficiently and in a confidential manner.

Other objects and advantages of the invention will become apparent from the detailed description and the drawings.

DETAILED DESCRIPTION OF THE PREFERRED EMBODIMENTS

Figure 1:
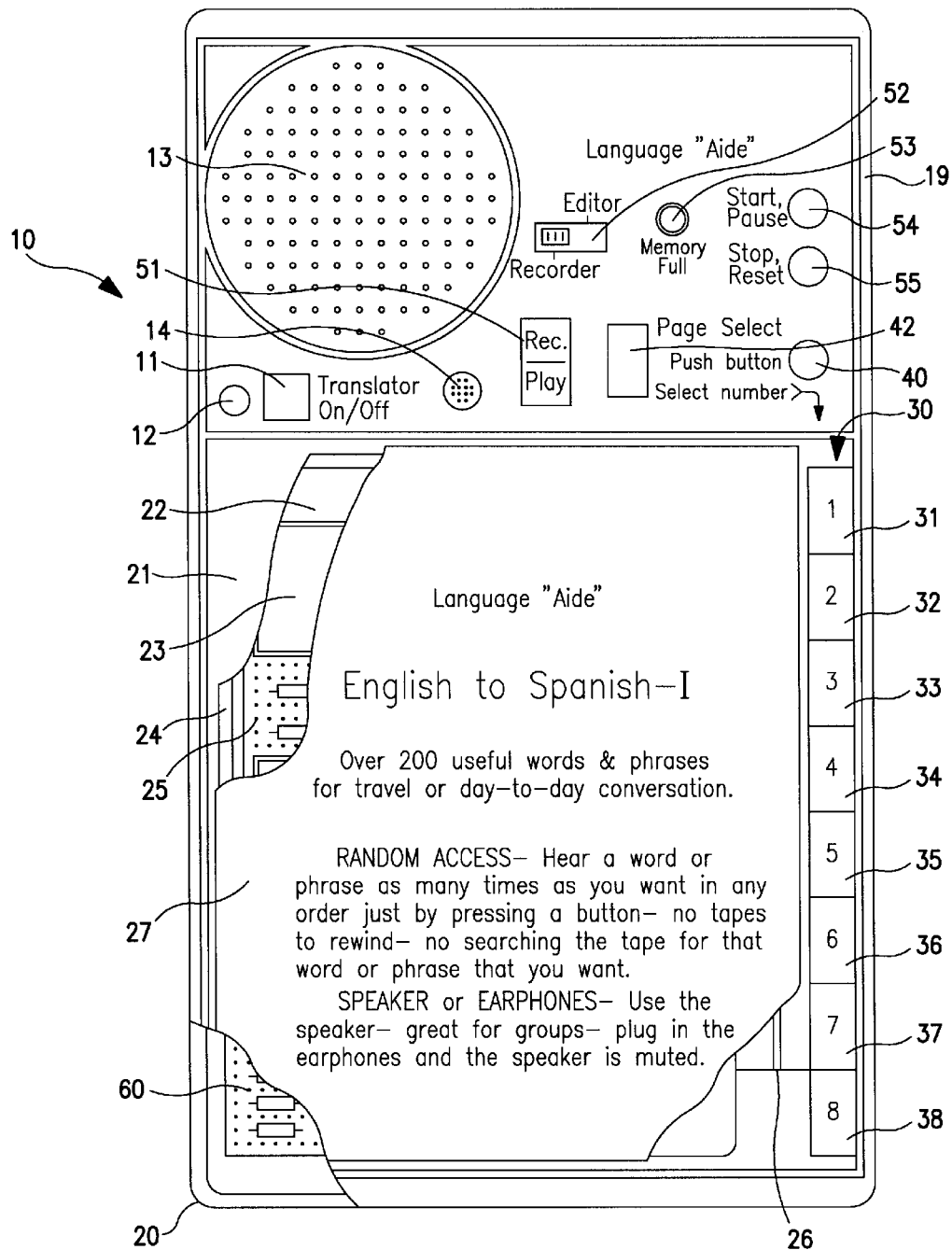
FIG. 1 is a top view, broken away, of a language translator in accordance with the present invention.

With reference to the drawings, wherein like numerals represent like parts throughout the figures, a language translator in accordance with the present invention is generally designated by the numeral 10. The translator 10 is a compact electronic device which is preferably battery-powered. The translator functions to selectively broadcast translations which are permanently recorded electronically in the device. A translation is selected and then accessed by the user via a memory address. The memory address is associated with a given translation. The selected translation is broadcast through a speaker 13 or by means of earphones (not shown) plugged into earphone jack 19. The user may repeat or simulate the translation into a microphone 14 and record same and then play back the recording so that a comparison may be made between the recorded translation of the user and the phonetically and grammatically proper translation stored in translator 10.

With reference to FIG. 1, the language translator comprises a case 20 which houses the electronic circuitry 60 and mounts various components, including speaker 13 and microphone 14, which provide the interactive communication between the translator 10 and the user. The case 20 includes an upper substrate 21 which receives and mounts memory module 22. Memory module 22 communicates electrically with circuitry 60 housed in case 20 by means of demountable connector 26 which readily permits removal and replacement of memory module 22 as desired. The memory module 22 comprises electronic memory 23, electronic memory housing 24, memory circuitry 25, a portion of demountable connector 26 and booklet 27.

Figure 2:
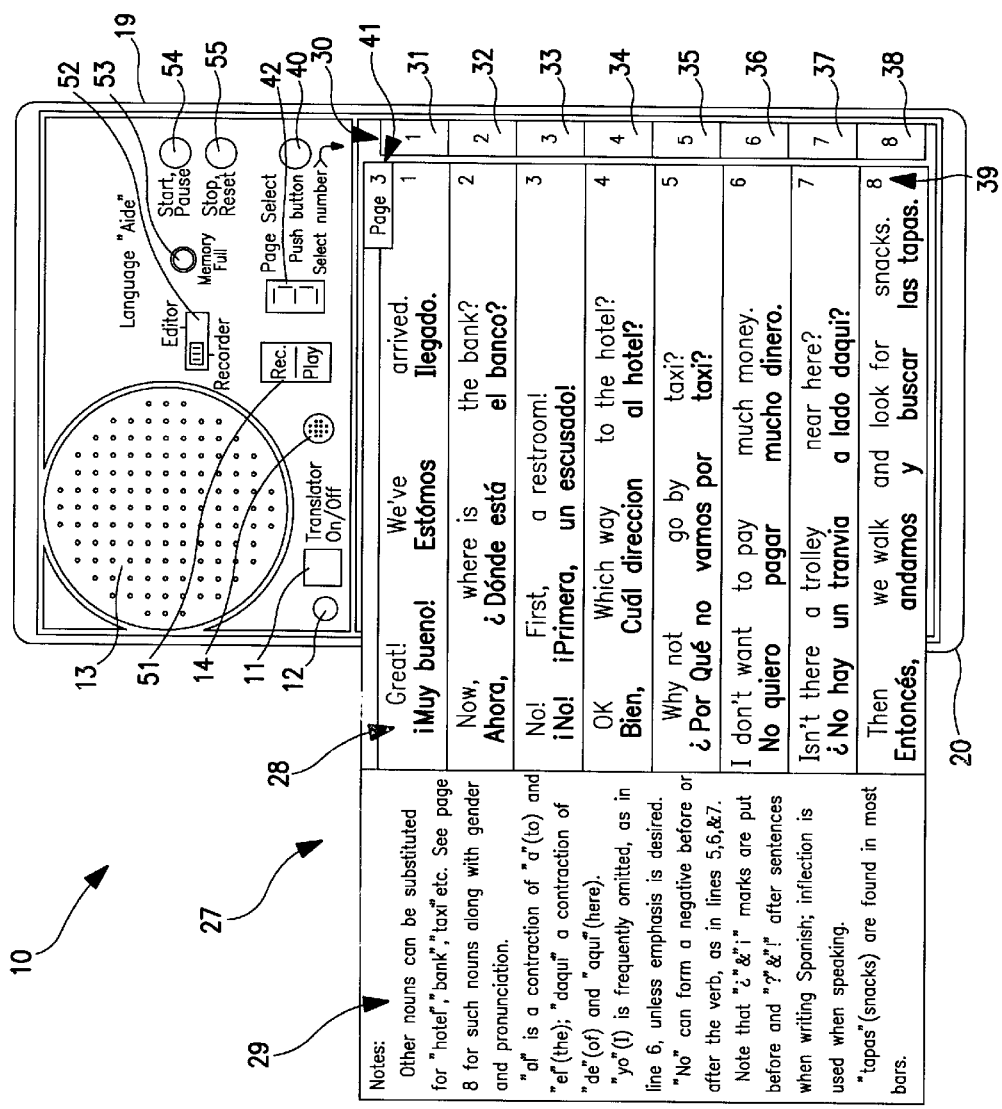
FIG. 2 is a top view of the language translator of FIG. 1 wherein a page of a representative booklet thereof has been opened for reference.

With reference to FIGS. 1 and 2, the booklet 27 is preferably a compilation of words and phrases arranged in matrix form by a page and line. The phrases for a given booklet 27 are preferably phrases used in normal conversation which are grammatically correct and are word forms that are understood by most people who speak the given language.

Booklet 27 may be opened to a given page as illustrated in FIG. 2 for a representative page for English/Spanish. The bilingual phrases 28 are co-linearly arranged with, for example, the base language phrase above and the second language translation below. The bilingual phrases 28 also are divided into meaningful groups, spaced apart for clarity, to essentially produce a linear language dictionary, in which the translation of a base language word or phrase is shown directly below and the meaning of a translation in base language is shown directly above. Such groupings demonstrate also how a translation is used in context. A composite index (not illustrated) may also be provided to facilitate the easy location of any translation pair. Notes 29 which pertain to, illuminate and explain translations may be presented at one side of each page. For example, the notes 29 may explain gender, how negatives may be formed and employed and how nouns, verbs and variations of the presented translations can be derived by the user as desired. A booklet 27 could comprise a number of similarly arranged pages.

A given phrase from the phrases 28 is selectable by a numerical input 30. The numerical input 30 may comprise a series of buttons 31–38. Each phrase 28 is identified by its linear alignment with one of the buttons 31–38, and may be similarly marked by a line number 39. Each page of booklet 27 is identified by a page number 41, preferably positioned near page number LED 42. To select a page, the page select 40 is actuated, followed by one of the buttons 31–38. Circuitry 60 causes the number of the button selected to be displayed by page number LED 42 and to be encoded and latched as a byte of memory address, to be applied to all phrase selections until another page selection is made. A phrase is selected by actuating its corresponding numerical input 30. Circuitry 60 causes the number of the button selected to be encoded as a byte of memory address and combined with the latched page byte, to construct the memory address for retrieval of the given phrase translation from electronic memory 23.

Figure 4:
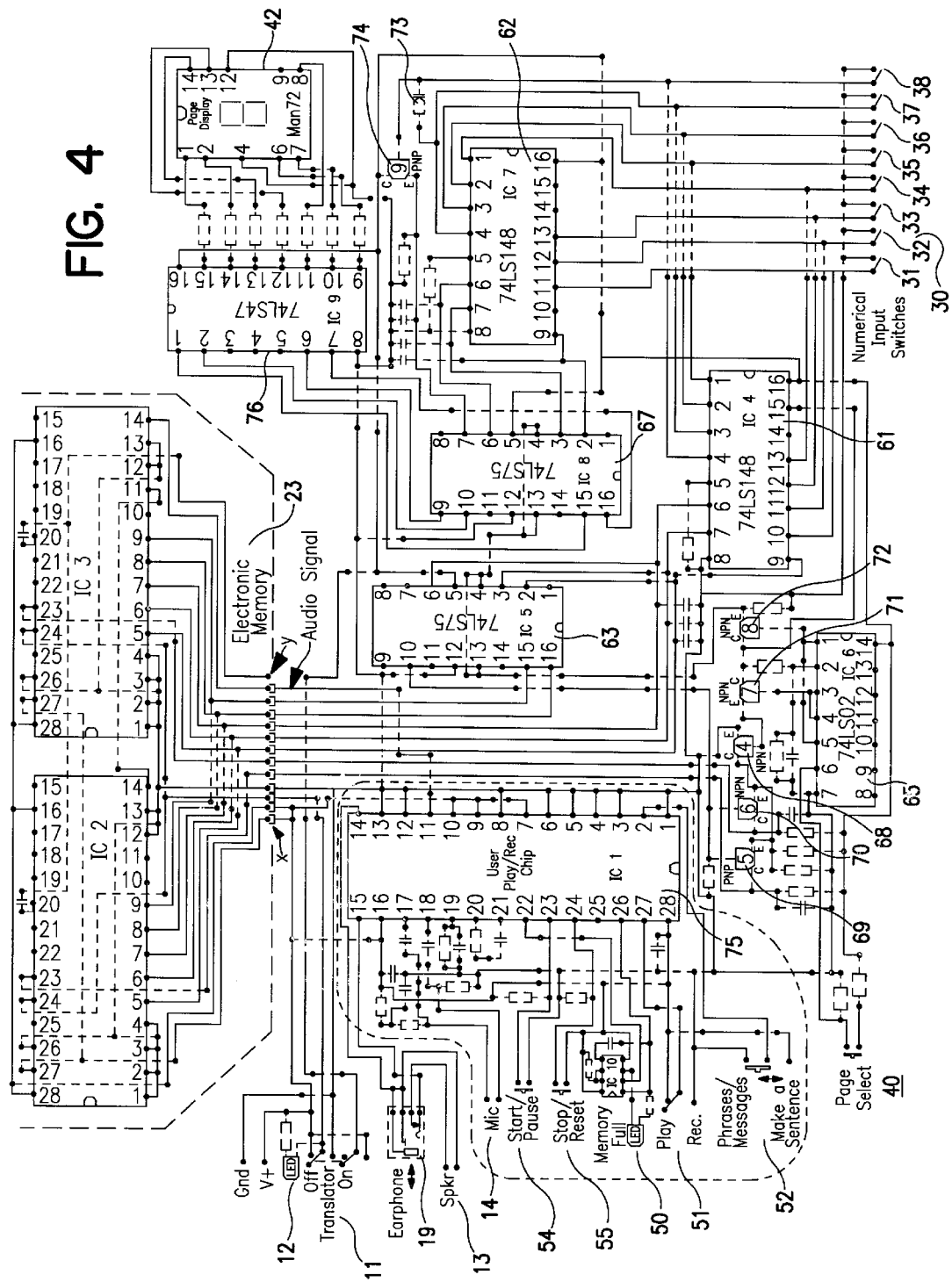
FIG. 4 is a schematic circuit diagram for the electronic components of the translator of FIG. 1.
Figure 5:
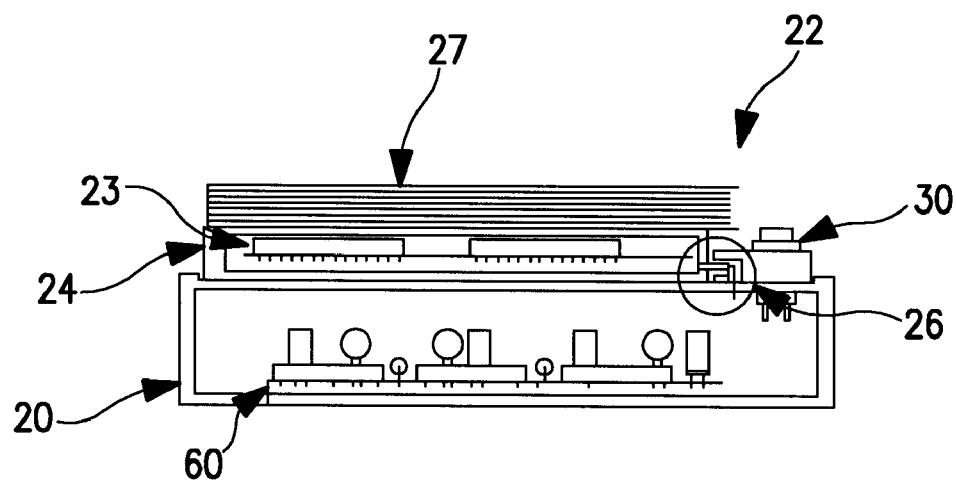
FIG. 5 is an end elevational view, portions removed, of the language translator of FIG. 1.
Figure 6:
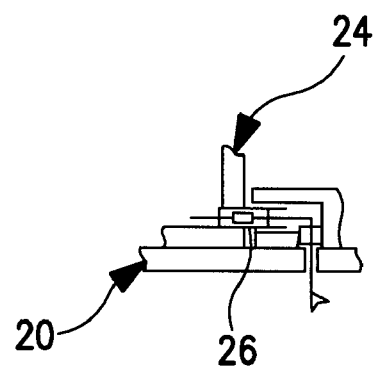
FIG. 6 is an enlarged fragmentary end view of a connector portion of the electronic translator as illustrated in FIG. 5.

With additional reference to FIG. 1 and 4, on-off switch 11 mounted on case 20 controls power to the language translation function of translator 10, the "on" state being indicated by illumination of on-off indicator LED 12. The recorder function 50 of circuitry 60 operates in an automatic power down mode. Playback is started by placing the record/playback switch 51 in the playback position and activating momentary start/pause switch 54. Playback stops automatically at the end of the recording and the recorder reenters the power down state. Reactivation of the start/pause switch 54 starts playback of the next recording. A recording is started by placing the record/playback switch 51 in the record position and momentarily activating the start/pause switch 54 and is stopped by a second momentary actuation of the start/pause switch 54, the action indicating a pause and the recorder reentering the power down state. The recording can be added to by reactuating the momentary start/pause switch. A recording can be indicated as being ended by actuating momentary stop/reset switch 55, the recorder reentering the power down state. The case 20 also mounts mode selector switch 52 which configures the recorder for the user to either record and play back messages individually or allows them to be edited and combined into longer statements. Case 20 also mounts memory full LED 53 which when illuminated indicates when memory of recorder function 50 is full.

Figure 3:
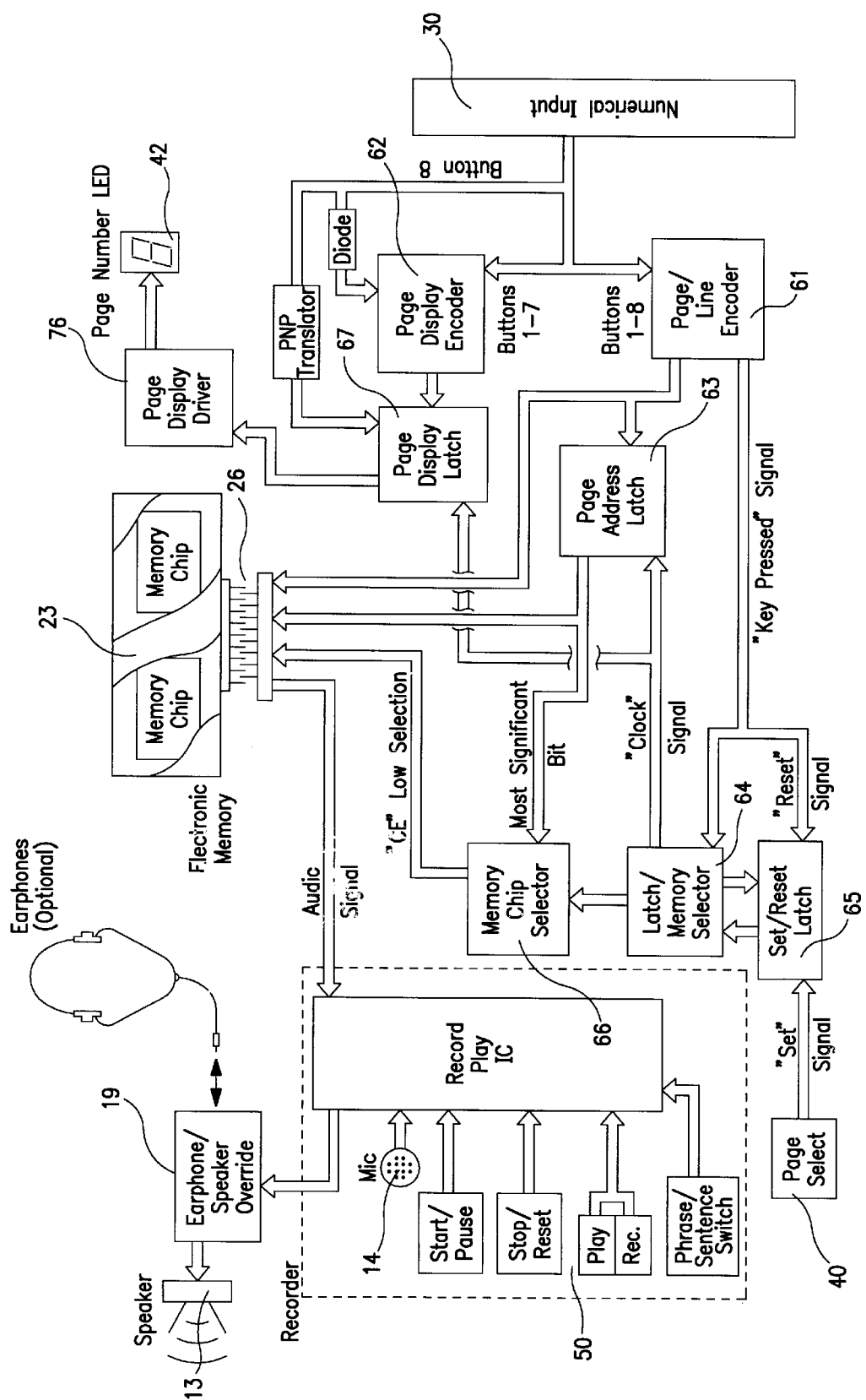
FIG. 3 is a functional schematic block diagram for the language translator of FIG. 1.

With reference to FIG. 3, numerical input switches 30 communicate with page/line encoder 61 and page/display encoder 62, each converting the selection into digital code. The digital code output of page/line encoder 61 is sent to page address latch 63 and to electronic memory 23. The digital code from page/line encoder 61 is interpreted by electronic memory 23 as one byte of a memory address. The digital code from page/line encoder 61 is latched by page address latch 63 upon receipt of a clock signal from latch/memory selector 64 and sent to electronic memory 23 as one byte of memory address. The digital code sent by page address latch 63 to electronic memory 23 is maintained by page address latch 63 until another clock signal is received from latch/memory selector 64. Each time one of the numerical input switches 30 is actuated, page/line encoder 61 emits a "key pressed" signal to set/reset latch 65 and to latch/memory selector 64. Depending on the configuration of latch/memory selector 64 at the time of its arrival, the "key pressed" signal from page/line encoder 61 is transmitted to either memory chip selector 66 or, as a clock signal, to page address latch 63 and to page display latch 67. Actuation of page select 40 "sets" set/reset latch 65 to configure latch/memory selector 64 to transmit the next "key pressed" signal received from page/line encoder 61 as a clock signal to page address latch 63 and to page display latch 67 to latch the number of the switch actuated as page number. That "next" signal from page/line encoder 61 also "resets" set/reset latch 65 and reconfigures latch/memory selector 64 to transmitting subsequent "key pressed" signals from page/line encoder 61 to memory chip selector 66 for line number selection until page selector 40 is again activated.

With reference to FIGS. 3 and 4, electronic memory 23 comprises, for example, two integrated chips. One method of dividing the available memory space results in thirty two memory addresses per chip. By employing eight numerical input switches 30, equal to one byte of digital code, each chip can hold four pages of eight lines each. Both chips receive the same address data from page address latch 63 and page/line encoder 61, but only if the chip receives the "key pressed" signal from page/line encoder 61 through latch/memory selector 64 and memory chip selector 66 as a low pulse on its CE (chip enable) pin can it act to copy the translation stored at the address and transmit it to speaker 13, or earphones if connected. Memory chip selector 66 uses the most significant bit of the digital code generated by page/line encoder 61, latched by page address latch 63, to select which of the integrated chip comprising electronic memory 23 is to be addressed. If the most significant bit is a zero, one chip will be addressed; if the most significant bit is a one, the other chip will be addressed. The "key pressed" signal from page/line encoder 61 is a high going pulse. The chips comprising electronic memory 23 require a low going pulse on the CE pin. Memory chip selector 66 comprises an NPN type transistor 68 to invert the signal, and a PNP type transistor 69 and an NPN type transistor 70 to direct the low going pulse to the proper chip of electronic memory 23. Latch/memory selector 64 comprises NPN type transistor 71 and NPN type transistor 72.

With reference to FIGS. 3 and 4, the digital output of page display encoder 62 is latched by page display latch 67 upon receipt of a clock signal from latch/memory selector 64. The digital output is transmitted to and decoded by page display driver 76 to illuminate page number LED 42. The number of the page selected remains illuminated until another page number is selected.

With reference to FIGS. 3 and 4, memory addresses in electronic memory 23 start from zero. Page and line numbering start with number one. To overcome the mismatch when selecting lines (the loss of one byte of memory address), numerical input switches 30 and page/line encoder 61 are connected starting with switch "one" 31 connected to page/line encoder 61 pin "zero" and ending with switch "eight" 38 connected to page/line encoder 61 pin "seven." The page mismatch occurs because the zero pin of page display encoder 62 cannot be used, there being no page numbered zero. Numerical input switches 30 and page display encoder 62 are connected starting with switch "one" 31 connected to page display encoder 62 pin "one," and ending with switch "seven" 37 connected to the last input pin of page display encoder 62, pin "seven." The remaining switch "eight" 38 is connected to page display encoder 62 pin "seven" through diode 73 to generate the first three bits of page number code and to the base of PNP type transistor 74 to send to page display latch 67 the fourth bit of page number code needed by page display driver 76 to illuminate number eight on page number LED 42.

With reference to FIGS. 3 and 4, the audio signal retrieved from electronic memory 23 is transmitted through recorder integrated chip 75 to earphone jack 19 and to earphones, or to speaker 13 if earphones are not being used.

With reference to FIG. 4, the recorder circuitry 50 is that suggested by Information Storage Devices, Inc. for using ISD2590 chips in push-button mode M6 and delete EOM marker mode M1. Other ISD devices, or similar devices, and appropriate circuitry can be substituted without altering the suitability of the device. Circuitry 60 is shown using 74LS series IC components. Other series of like function may be substituted. Page/line encoder 61 and page display encoder 62 may be a 74LS148 component. Page address latch 63 and page display latch 67 may be a 74LS75 component. Set/reset latch 65 may be a 74LS02 component and page display encoder 62 may be a 74LS47 component.

With reference to FIG. 4, electronic memory 23 comprises two ISD2590 chips which, once addressed and recorded, are maintained as read only memory by P/R pin being "high" during operation.

It should be appreciated that all of the buttons, switches and booklet can be affixed with Braille and dot embossing so that they can be used by a visually impaired individual.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An electronic translator comprising:
   case means including circuitry and having an upper substrate;
   a memory module mounted to said substrate and demountably connected to said circuitry; said memory module comprising:
      electronic memory means comprising a plurality of permanently electronically stored translations; and
      menu means comprising a booklet for listing an array of base language selections corresponding to said translations;
   manually selectable access means communicating with said memory means and said circuitry for accessing a translation corresponding to a selected base language selection;
   audio means communicating with said memory means and said access means for reproducing said selected translation in audio form; and
   recording means communicating with said circuitry for recording a trial translation.

2. The electronic translator of claim 1 further comprising replay means for reproducing said trial translation in audio form.

3. The electronic translator of claim 1, wherein said menu means further comprises an array of phrases and corresponding translations and a corresponding designation for each said phrase.

4. The electronic translator of claim 2, wherein said recording means further comprises means for recording a second trial translation over said first trial translation.

5. The electronic translator of claim 1, wherein said booklet comprises lists of base language phrases and corresponding translations arranged in a linear form.

6. The electronic translator of claim 5, wherein said access means comprises a first input means for indicating the line number of said selected phrase.

7. The electronic translator of claim 6 further comprising a second input means for indicating the page number of said booklet for said selected phrase.

8. The electronic translator of claim 1, wherein said memory module further comprises a plug-in module.

9. The electronic translator of claim 1, wherein said booklet opens to extend beyond said upper substrate.

10. The electronic translator of claim 1, wherein said audio means comprises an integrated chip.

11. An electronic translator comprising:

a compact case having a top panel and a connector;

a module removably mounted to said top panel and connected to said connector, said module having an upper portion opposite said top panel and further comprising:
  memory means comprising a plurality of electronically stored translations; and
  a booklet disposed at said upper portion for listing an array of base language selections corresponding to said translations;

selection means having at least one selector mounted to said case for selecting a translation corresponding to a selected base language selection; and audio means communicating with said selection means and said memory means for reproducing said selected translation in audio form.

12. The electronic translator of claim 11 wherein said audio means comprises a recorder integrated chip.

13. The electronic translator of claim 11, wherein said booklet opens to extend beyond said top panel.

* * * * *